July 3, 1956

J. M. MILLER, JR 2,753,404

GROUNDED-GRID AMPLIFIER

Filed April 20, 1954

JOHN M. MILLER, JR
*INVENTOR.*

BY

Killman and Kerst
*ATTORNEYS*

United States Patent Office 2,753,404

Patented July 3, 1956

2,753,404

GROUNDED-GRID AMPLIFIER

John M. Miller, Jr., Baltimore, Md., assignor to Bendix Aviation Corporation, Towson, Md., a corporation of Delaware Application April 20, 1954, Serial No. 424,353

2 Claims. (Cl. 179—171)

This invention relates to grounded-grid amplifiers and in particular, to grounded-grid amplifiers in which the tube characteristics have a negligible effect on the input impedance of the amplifier.

To provide an R. F. amplifier in which neutralization is not required, the grounded-grid amplifier may be employed. In this circuit a triode tube is so connected that the grid electrode is R. F.-wise returned to ground and the input signal is inserted between the cathode electrode and ground. Through this connection, any R. F. current flowing through the grid circuit because of the grid to plate capacitance will not flow through the input circuit but will instead flow through ground between the plate circuit and the grid electrode.

Because of the circuit arrangement of the conventional grounded-grid amplifier, the input impedance is relatively low and a function of the characteristics of the tube. Therefore, in applications where a constant input impedance is required, the tube must be so operated that the characteristics of the tube are maintained constant. Under some operating conditions, such a situation is not realizable.

An application of a grounded-grid amplifier where the conventional circuit will not maintain a constant input impedance is in AGC operations. In applying the circuit to AGC operation, it is necessary to provide a tube whose characteristics are functions of the biasing voltage applied between the grid and cathode electrodes.

This invention provides a means in a grounded-grid amplifier such that the input impedance is dependent on the characteristics of the tube to a negligible extent. It is therefore possible to apply this invention to grounded-grid amplifiers where it is desired to maintain a relatively constant input impedance with varying tube characteristics.

An object of this invention is to provide a means in a grounded-grid amplifier for maintaining a relatively constant input impedance when the characteristics of the tube in the amplifier are varied.

Referring to the drawings.

Figure 1:
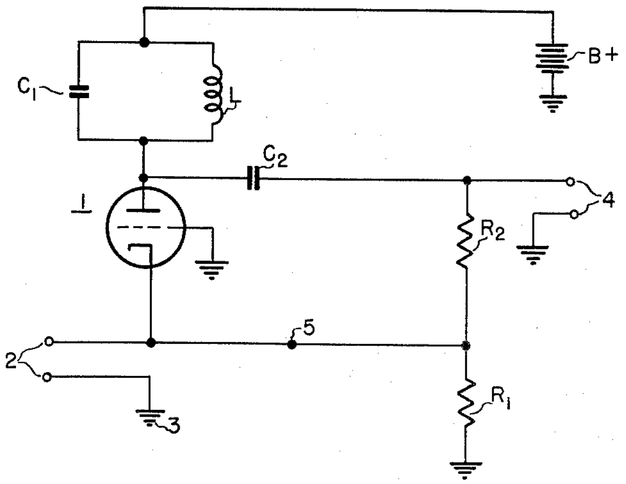
Fig. 1 is a schematic diagram of a circuit illustrating the invention.

Referring in particular to Fig. 1, a schematic diagram of a circuit illustrating the invention is presented. The cathode electrode of a triode tube 1 is connected to one of a pair of input terminals 2. The remaining terminal of input terminals 2 is connected to a ground 3. The grid electrode of the tube 1 is returned to the ground 3. If a biasing means is necessary for the proper operation of the tube 1, it may be placed between the grid electrode and the ground 3. For simplification purposes, such biasing means have been eliminated. One terminal of a tuned circuit comprising capacitor $C_1$ and inductor L is connected to the plate electrode of the tube 1. The remaining terminal of the tuned circuit is connected to the positive terminal of a D. C. potential source B+. The negative terminal of the source B+ is returned to the ground 3. A coupling capacitor $C_2$ couples the plate electrode of the tube 1 to one of a pair of output terminals 4. The remaining output terminal is returned to the ground 3. The values of the capacitor $C_1$ and inductor L are so chosen that the tuned circuit will resonate at the frequency of the incoming signal. Two resistors $R_1$ and $R_2$ form a voltage divider across the output terminals 4. The junction of the resistors $R_1$ and $R_2$ is returned to the cathode of the tube 1.

In the conventional grounded grid amplifier the input impedance is a function of the reciprocal of the transconductance of the tube. As the bias on the tube is changed the transconductance of the tube changes and the result is an accompanying change in the input impedance.

In the circuit of the instant invention, however, the impedance of the circuit $C_1$ L being high enough that current flow therethrough is negligible, and the resistance of the combination of resistors $R_2$, $R_1$ being substantially lower, the current flowing into the cathode of the tube from the upper input terminals is substantially equalled by the current flowing back to that terminal from the output of the tube, by way of resistor $R_2$, and the input impedance is thus substantially that presented by the resistor $R_1$ regardless of the transconductance of the tube.

From an alternative viewpoint, a signal applied to the terminals 2 will produce a corresponding current through the resistor $R_1$, this current flowing by way of the direct connection 5 and also by way of the vacuum tube 1, the coupling condenser $C_2$ and the resistor $R_2$. If no current were diverted through the path including the tuned circuit $C_1$ L or the path including the external load device connected to terminals 4, the current through the input device connected to terminals 2 would necessarily be equal to the current through the resistor $R_1$, regardless of the transconductance of the vacuum tube 1. The transconductance of the vacuum tube simply determines the ratio of the currents through the two branches which include the connection 5 and the resistor $R_2$, and not their sum. By virtue of the fact that the impedances of the tuned circuit $C_1$ L and the external load are high enough relative to the impedance of the resistors $R_2$ and $R_1$ that substantially no current flows through them, the input impedance is substantially that of resistor $R_1$. The gain of the circuit varies from unity when the tube 1 is cut off to a limiting value approaching $$\frac{R_1+R_2}{R_1}$$

when the transconductance of tube 1 is high.

Figure 2:
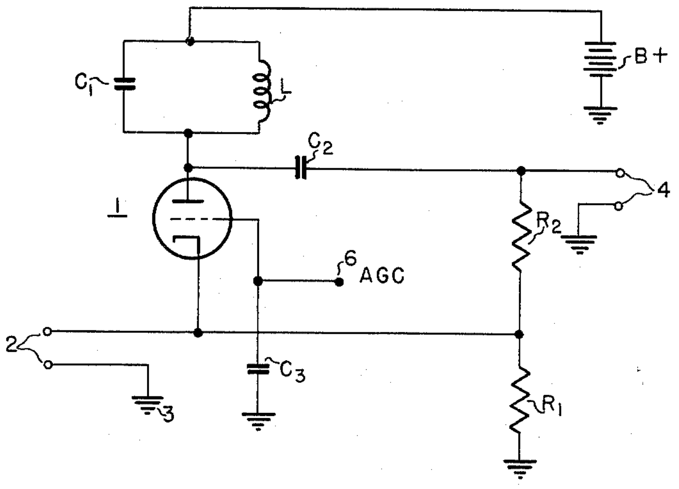
Fig. 2 is a schematic diagram of a circuit illustrating the invention for AGC applications.

Fig. 2 is a schematic diagram of an AGC circuit embodying the circuit illustrated in Fig. 1. A bypass capacitor $C_3$ and an AGC voltage input terminal 6 have been provided.

Although a particular embodiment of the invention has been shown by the circuits in Figs. 1 and 2, it is to be understood that other embodiments of the invention are possible. As evident to those skilled in the art, the tuned circuit comprising the capacitor $C_1$ and the inductor L may be replaced by other components, or combinations thereof, that exhibit impedances that are large with respect to the components shunting the output terminals.

What is claimed is:

1. A grounded-grid amplifier, comprising: an electron tube; said tube comprising a plate electrode, a cathode electrode and at least one grid electrode; a pair of input terminals; a ground; means connecting one of said pair of input terminals to the said ground; means connecting the remaining terminal of the said pair of input terminals to the said cathode electrode; a resistor; means connecting one terminal of the said resistor to the said ground; means connecting the remaining terminal of the said resistor to the said cathode electrode; a parallel circuit; said circuit comprising a capacitor and an inductor; the values of the said capacitor and the said inductor being so chosen as to resonate at the frequency of the input signal; a D. C. potential source; means connecting one terminal of the said circuit to the said plate electrode; means connecting the remaining terminal of the said circuit to the positive terminal of the said source; means connecting the negative terminal of the said source to the said ground; a capacitor; a pair of output terminals; means connecting one terminal of the said capacitor to the said plate electrode; means connecting the remaining terminal of the said capacitor to one terminal of the said pair of output terminals; means connecting the remaining terminal of the said pair of output terminals to the said ground; a second resistor; means connecting one terminal of the said second resistor to the first said terminal of the said pair of output terminals; means connecting the remaining terminal of the said second resistor to the said cathode electrode; and means connecting the said grid electrode to the said ground.

2. A grounded-grid amplifier; comprising: an electron tube; said tube comprising a plate electrode, a cathode electrode and at least one grid electrode; a pair of input terminals; a ground; means connecting one of said pair of input terminals to the said ground; means connecting the remaining terminal of the said pair of input terminals to the said cathode electrode; a resistor; means connecting one terminal of the said resistor to the said ground; means connecting the remaining terminal of the said resistor to the said cathode electrode; an impedance; a D. C. potential source; means connecting one terminal of the said impedance to the said plate electrode; means connecting the remaining terminal of the said impedance to the positive terminal of the said source; means connecting the negative terminal of the said source to the said ground; a capacitor; a pair of output terminals; means connecting one terminal of the said capacitor to the said plate electrode; means connecting the remaining terminal of the said capacitor to one terminal of the said pair of output terminals; means connecting the remaining terminal of the said pair of output terminals to the said ground; a second resistor; means connecting one terminal of the said second resistor to the first said terminal of the said pair of output terminals; means connecting the remaining terminal of the said second resistor to the said cathode electrode; and means connecting the said grid electrode to the said ground.

References Cited in the file of this patent

UNITED STATES PATENTS

| | | |
|---|---|---|
| 2,489,266 | Cawein | Nov. 29, 1949 |
| 2,600,120 | MacSorley | June 10, 1952 |